United States Patent

Epstein

(10) Patent No.: US 6,845,356 B1
(45) Date of Patent: Jan. 18, 2005

(54) PROCESSING DUAL TONE MULTI-FREQUENCY SIGNALS FOR USE WITH A NATURAL LANGUAGE UNDERSTANDING SYSTEM

(75) Inventor: Mark E. Epstein, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 09/773,172

(22) Filed: Jan. 31, 2001

(51) Int. Cl.[7] .............................................. G10L 15/18
(52) U.S. Cl. ..................................... 704/235; 704/257
(58) Field of Search ................................. 704/235, 257

(56) References Cited

U.S. PATENT DOCUMENTS

| | | | | |
|---|---|---|---|---|
| 5,337,347 A | * | 8/1994 | Halstead-Nussloch et al. ........................ | 379/88.14 |
| 5,699,417 A | * | 12/1997 | Khojasteh .............. | 379/142.01 |
| 5,732,395 A | * | 3/1998 | Alexander Silverman .. | 704/260 |
| 5,802,150 A | * | 9/1998 | Beck et al. .............. | 379/93.06 |
| 5,832,063 A | * | 11/1998 | Vysotsky et al. ........ | 379/88.03 |
| 6,137,878 A | * | 10/2000 | Vonder Haar et al. ...... | 379/361 |
| 6,269,336 B1 | * | 7/2001 | Ladd et al. .................. | 704/270 |
| 6,278,770 B1 | * | 8/2001 | Makihata ..................... | 379/76 |
| 6,311,159 B1 | * | 10/2001 | Van Tichelen et al. ..... | 704/275 |
| 6,496,799 B1 | * | 12/2002 | Pickering .................... | 704/235 |
| 6,510,414 B1 | * | 1/2003 | Chaves ....................... | 704/270 |
| 6,526,382 B1 | * | 2/2003 | Yuschik ...................... | 704/275 |
| 6,601,029 B1 | * | 7/2003 | Pickering .................... | 704/257 |
| 2001/0012350 A1 | * | 8/2001 | Ehlinger ..................... | 379/196 |
| 2002/0071545 A1 | * | 6/2002 | Burns ......................... | 379/368 |

* cited by examiner

*Primary Examiner*—Vijay Chawan
*Assistant Examiner*—Michael N. Opsasnick
(74) *Attorney, Agent, or Firm*—Akerman Senterfitt

(57) ABSTRACT

A method for processing dual tone multi-frequency signals for use with a natural language understanding system can include several steps. The step of determining whether a audio input signal is a dual tone multi-frequency signal or a human speech signal can be included. If the audio input signal is determined to be a dual tone multi-frequency signal, the audio input signal can be converted to at least one text equivalent. Also, the step of providing the at least one text equivalent to a natural language understanding system can be included. The natural language understanding system can determine a meaning from the text equivalent.

20 Claims, 2 Drawing Sheets

PROCESSING DUAL TONE MULTI-FREQUENCY SIGNALS FOR USE WITH A NATURAL LANGUAGE UNDERSTANDING SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of natural language understanding, and more particularly, to a method of processing dual tone multi-frequency signals in a conversational natural language system.

2. Description of the Related Art

Natural language understanding (NLU) systems enable computers to understand and extract information from human written or spoken language. Such systems can function in a complimentary manner with a variety of other computer applications where there exists a need to understand human language. NLU systems can extract relevant information contained within text and then supply this information to another application program or system for purposes such as booking flight reservations, finding documents, or summarizing text.

Currently within the art, many NLU systems are implemented as directed dialog systems. Directed dialog NLU systems typically prompt or instruct a user as to the proper form of an immediate user response. For example, a directed dialog NLU system can instruct a user as follows "Press or say 1 for choice A, Press or say 2 for choice B". By instructing the user as to the proper format for an immediate user response, the NLU system can expect a particular type of response such as speech input or keypad input. Accordingly, the NLU system can process that user response more accurately and function more efficiently.

For an NLU system to be capable of accepting keypad input from a telephone, known as dual tone multi-frequency (DTMF) signaling, the NLU system must be DTMF enabled. Specifically, the NLU system requires programming for converting the DTMF signals into corresponding numeric values. Once converted into numeric values, the meaning of the resulting digit strings need not be determined and can be passed directly to the part of the NLU system responsible for determining a user action and the arguments of that action. In other words, the digit string need not be pre-processed by the sub-systems of the NLU system responsible for meaning extraction as would be the case had the user uttered a complete sentence containing spoken numbers. In conventional NLU system implementations, however, bypassing the pre-processing sub-systems responsible for meaning extraction, i.e., parsing input text and classing that text, can be complex.

For example, an NLU system and its constituent parts, such as a speech recognition system, can be implemented within an interactive voice response unit (IVR) designed to work cooperatively with a telephone switching system. An IVR unit, as is known in the art, can accept a combination of voice telephone input and DTMF input from a keypad. Each telephony hardware manufacturer, however, typically has a proprietary interface for dealing with hardware and software components requiring a custom solution for each manufacturer's equipment. Moreover, at each point in the NLU system where DTMF signals can be received, the NLU system's pre-processing systems must be bypassed. Thus, special programming must be included in each location in the NLU system where DTMF input is acceptable. Notably, this solution can be complex, though system designers can plan for the complexity in the case of a directed dialog NLU system by expressly asking a user to speak or to press a key. Thus, system designers can limit the number of response points where a user can respond using DTMF signaling.

As NLU systems advance, however, and move away from directed dialog systems toward more conversational systems, the NLU system must be able to receive input in a variety of formats. Because conversational NLU systems do not give users the directed and immediate guidance associated with directed dialog NLU systems, a user can unexpectedly press a key to make a selection rather than speak the selection. For a conversational NLU system to receive and process both DTMF and speech at any response point, the NLU system would have to incorporate the special bypass programming at each response point. As a result, a conversational NLU system implemented in this manner would be prohibitively complex.

SUMMARY OF THE INVENTION

The invention disclosed herein concerns a method for processing dual tone multi-frequency (DTMF) signals in a natural language understanding (NLU) system. According to one embodiment of the invention, DTMF signals can be distinguished from signals originating from a human voice. Once the signal is identified as a DTMF signal or a human voice signal, the invention can properly process and route the signal. Specifically, if the signal is identified as a human voice, the signal can be provided to a speech recognition system for converting speech to text. If, however, the signal is identified as a DTMF signal, the invention can determine one or more text equivalents for the numeric values represented by the DTMF signal. The invention further can use prosodic information, which can generally be referred to as timing information of the DTMF signals, to aid in the determination of text equivalents. The text equivalents can be provided to the front end of an NLU system as if the text had been output from the speech recognition system. Converting DTMF signals into text equivalents for processing by an NLU system as normal text alleviates the need to implement complex and custom solutions to bypass NLU pre-processing sub-systems.

One aspect of the invention can be a method for processing DTMF signals for use with an NLU system which can include a series of steps. The steps can include determining whether the audio input signal is a human speech signal or a DTMF signal. If the audio input signal is determined to be a DTMF signal, the step of converting the audio input signal to a text equivalent can be included. Also, one or more prosodic characteristics of the received DTMF signal can be determined. Notably, the determined prosodic characteristics can be used to determine the text equivalent. If the audio input signal is determined to be a human speech signal, those input signals can be provided to a speech recognition system for converting speech to text. The method further can include the step of collating text received from the speech recognition system with at least one text equivalent of the DTMF signals. In any case, the text equivalent, the text from the speech recognition system, or both the text equivalent and the text from the speech recognition system in collated format can be provided to an NLU system. The NLU system can determine a meaning from the text equivalent and can provide contextual feedback from the NLU system to the converting step.

Another embodiment of the invention can be a method for processing DTMF signals for use with an NLU system. The method can include the step of receiving a DTMF signal. One or more prosodic characteristics of the received DTMF signal can be determined. The method further can include the step of converting the dual tone-multi frequency signals to a text equivalent. Notably, the determined prosodic characteristics can be used to determine the text equivalent. The method further can include the step of providing the text equivalent to an NLU system. The NLU system can determine a meaning from the text equivalent and can provide contextual feedback to the converting step for converting the identified DTMF signals to the text equivalent.

Another aspect of the invention can be a machine readable storage, having stored thereon a computer program having a plurality of code sections executable by a machine for causing the machine to perform a series of steps. The steps can include determining whether an audio input signal is a human speech signal or a DTMF signal. If the audio input signal is determined to be a DTMF signal, those signals can be converted to a text equivalent. Also, one or more prosodic characteristics of the received DTMF signals can be determined. The determined prosodic characteristics can be used in the converting step to determine the text equivalent. If the audio input signals are determined to be human speech signals, those input signals can be provided to a speech recognition system for converting speech to text. The method further can include the step of collating text received from the speech recognition system with at least one text equivalent of the DTMF signals. Notably, the text equivalent of the DTMF signal, the text from the speech recognition system, or both the at least one text equivalent and the text from the speech recognition system in collated format can be provided to an NLU system. The NLU system can determine a meaning from the text equivalent and further can provide contextual feedback to the converting step.

Another embodiment of the invention can be a machine readable storage, having stored thereon a computer program having a plurality of code sections executable by a machine for causing the machine to perform a series of steps. The steps can include receiving a DTMF signal. One or more prosodic characteristics of the received DTMF signal can be determined. The step of converting the DTMF signals to a text equivalent can be included. Further, the determined prosodic characteristics can be used in the converting step to convert the received DTMF signals to the text equivalent. Also, the step of providing the text equivalent to an NLU system can be included. Notably, the NLU system can determine a meaning from the text equivalent and further can provide contextual feedback to the converting step.

Another aspect of the invention can be a system for converting DTMF signals into text equivalents for use with an NLU system. The system can include an interactive voice response unit for receiving user spoken utterances and DTMF signals. Further, a DTMF converter for converting the DTMF signals into text equivalents can be included. Also, and NLU system for determining a meaning from text converted from the user spoken utterances and the text equivalents can be included. The system further can include a speech recognition system for converting user spoken utterances to text. Finally, a collator for collating text converted from the user spoken utterances and the text equivalents can be included.

BRIEF DESCRIPTION OF THE DRAWINGS

There are shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method for processing dual tone multi-frequency (DTMF) signals for use with a natural language understanding (NLU) system. DTMF signals consist of two tones having specific frequencies. These signals can be produced and sent to a telephone switch when a touch key on a telephone is pressed. The first tone is produced from a high pitched group of tones, and the second tone is produced from a group of tones lower in pitch. Consequently, because a DTMF signal is comprised of two distinct tones, a DTMF signal is distinguishable from a human voice and speech.

According to one embodiment of the invention, DTMF signals can be distinguished from signals originating from a human voice. Once the signal is identified as a DTMF signal or a human voice signal, the invention can process the signal and properly route the signal. Specifically, if the signal is identified as a human voice, the signal can be provided to a speech recognition system for converting speech to text. If, however, the signal is identified as a DTMF signal, the signal can be processed to determine the numeric values corresponding to that signal. Once those values are determined, the invention can determine a text equivalent for the numeric values. The text equivalent can be provided to the front end of an NLU system as if the text had been output from the speech recognition system. Thus, DTMF capability can be integrated in the early stages of processing of an NLU system such that the capability can be transparent to a user. Moreover, converting DTMF signals into text equivalents for processing by an NLU system as normal text alleviates the need to implement complex and custom solutions to bypass NLU pre-processing sub-systems. Notably, the invention can be used with directed dialog as well as conversational NLU systems.

Figure 1:
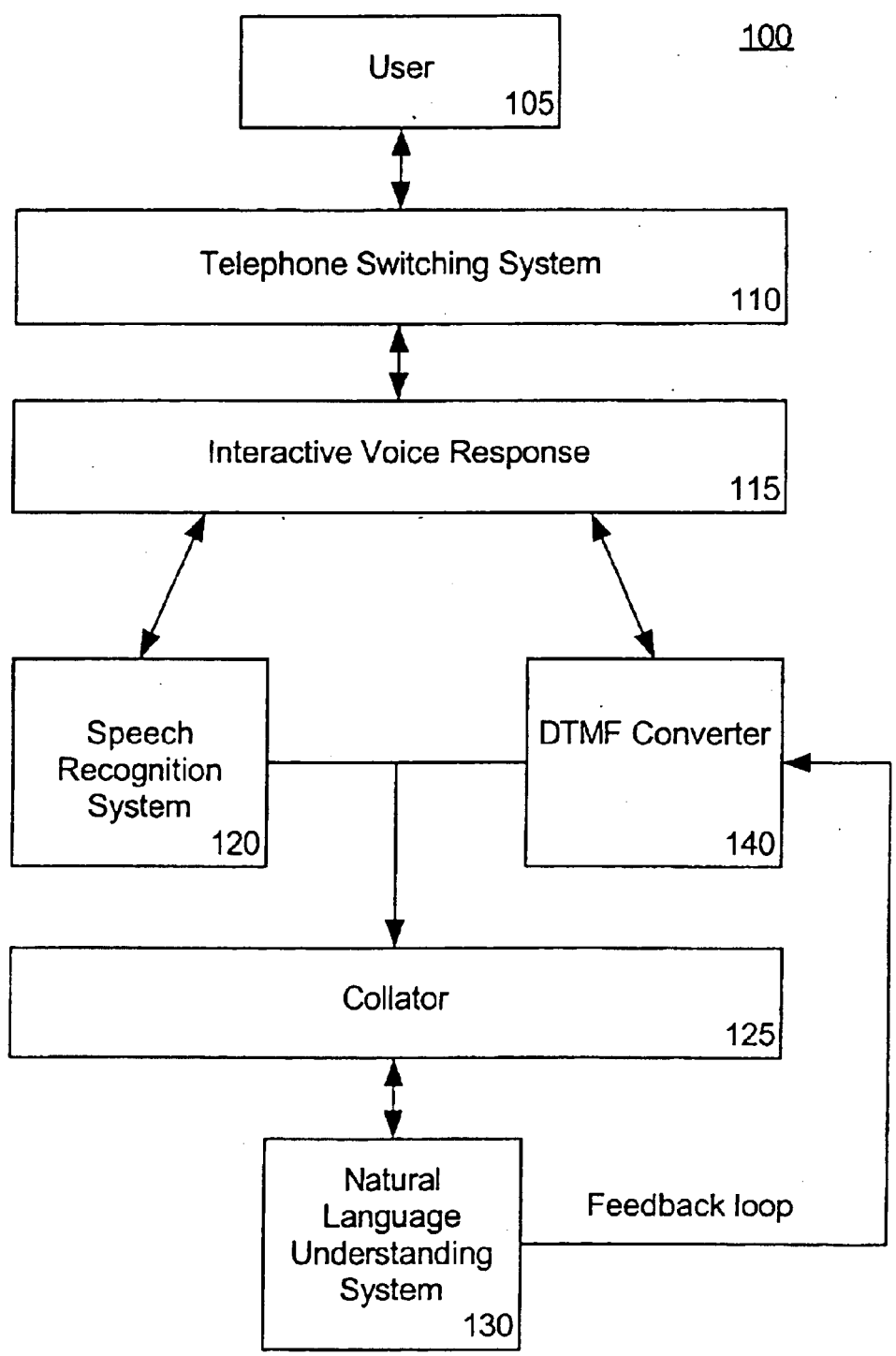
FIG. 1 is a schematic diagram depicting an exemplary configuration utilizing the system of the invention.

FIG. 1 depicts an exemplary system 100 containing a telephone switching system 110, an interactive voice response (IVR) unit 115, a speech recognition system 120, a DTMF converter 140, a collator 125, and an NLU system 130. System 100 can be any system which requires an understanding of, or an extraction of information from human speech. Examples of such systems can include, but are not limited to, automated reservation systems and automated help desks.

In exemplary system 100, the telephone switching system 110 can be any conventional telephonic switching system for selecting a path or circuit for the transmission of data. Alternatively, telephone switching system 110 can be an on premise type of telephone switching system, such as a private automatic branch exchange (PABX) for providing call routing functions at a particular location.

An IVR unit 115 also can be included within the system 100. The IVR unit 115, as is known in the art, can accept a combination of voice telephone input and DTMF input from a keypad. The IVR unit 115 can be implemented as a standalone computer system, or can be contained within the telephone switching system 110. The speech recognition system 120, the NLU system 130, the collator 125, and the DTMF converter 140 can be realized in a centralized fashion within the IVR unit 115. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited.

A typical combination of hardware and software could be a general purpose computer system with a computer program that, when being loaded and executed, controls the computer system such that it carries out the methods described herein. For example, the computer system can be equipped with the necessary hardware, i.e., audio circuitry (sound card), memory, central processing unit, and modem, to perform speech recognition and speech synthesis functions. The present invention also can be embedded in a computer program product, which comprises all the features enabling the implementation of the methods described herein, and which when loaded in a computer system, is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

The speech recognition system 120 can receive a user spoken utterance, and convert that utterance to a text representation. The NLU system 130 can use statistical processing or grammatical processing methods for determining a meaning from the text representation supplied by the speech recognition system 120. It should be appreciated that speech recognition systems and NLU systems are well known in the art and are commercially available from manufacturers such as International Business Machines Corporation. The collator 125 can reorder text using the time stamp information associated with each portion of text or each word. The DTMF converter 140 can receive DTMF signals and produce numeric and text representations of those signals.

In operation, a user 105 can initiate a communications session with system 100 through a conventional communications link. More specifically, the communications link can be a data connection through a computer communications network, the Internet, or a voice connection via telephone. For example, with the latter instance, the user 105 can contact system 100 by dialing a service telephone number and initiating voice communication with the telephone switching system 110. In response, system 100 can answer the user's telephone call and provide service options through a prerecorded message or through an optional speech synthesizer module (not shown). For example, system 100 can instruct the user as follows: "Please enter your personal identification code."

Subsequently, the user 105 can utter the appropriate personal identification code into a telephone handset. Alternatively, the user 105 can enter a personal identification code using the touch keys on the telephone. Still, the user 105 can respond using a combination of both speech and touch keys. For example, the user 105 can begin to say "My personal identification code is . . . ", but realizing that another person may overhear, finish the response using the touch keys to enter the personal identification code. The user's response can be passed from the telephone switching system 110 to the IVR unit 115 as digital audio data.

The IVR unit 115 can process the received digital audio data. Notably, as discussed above, the IVR unit 115 can distinguish between speech or a human voice and DTMF audio data. Upon receiving digital audio data, the IVR unit 115 can time stamp the digital audio data. For example, in the case of DTMF input, the IVR unit 115 can assign a time stamp to each received DTMF signal representing a numeric value. By comparison, in the case of speech input, the IVR unit 115 can time stamp the beginning and ending of a stream of digital audio data representing speech or a human voice. After processing the received digital audio data, in the case of speech input, the IVR unit 115 can transfer the time stamped speech digital audio to the speech recognition system 120 for conversion to text. By comparison, in the case of DTMF input, the IVR unit 115 can transfer the received DTMF digital audio to the DTMF converter 140 for further processing.

In the case of speech input; the speech recognition system 120 can convert user spoken utterances in the form of digital audio to text words. Additionally, because the digital audio contains a time stamp, traditionally a beginning time stamp and an ending time stamp, the speech recognition system 120 can determine a time stamp for each recognized word by extrapolating from the start time to the end time. After converting user spoken utterances to text, the resulting text and corresponding time stamps can be provided to the collator 125.

By comparison, in the case of DTMF input, the DTMF converter 140 can receive DTMF digital audio from the IVR unit 115 and convert the received DTMF signal into a text word equivalent. In performing that conversion, the DTMF converter 140 can perform several functions. For example, the DTMF converter 140 can convert the received DTMF signals into numeric values. Notably, each resulting numeric value can be associated with the original time stamp assigned to the corresponding DTMF signal by the IVR unit.

Another function of the DTMF converter 140 can be to analyze prosodic information relating to the DTMF signal. Because each received DTMF signal has a corresponding time stamp, the DTMF converter 140 can determine the amount of time between each successive key touch resulting in a DTMF signal. The DTMF converter 140 can utilize this information to group numeric values into clusters. For example, if a user types a social security number, that user ill likely press the numeric keys as follows: a cluster of 3 digits with little space between them followed by a larger space, then a cluster of 2 closely spaced digits followed by a large space, and finally a cluster of 4 closely spaced digits. Similarly, using a date as an example, if the user types in "102070", where the DTMF converter 140 detects larger spaces between the 1 and the 2, and the second 0 and the 7, the resulting number clustering can be "10, 20, 70" rather than "102,070", or "102070", or "1020, 70".

The DTMF converter also can map numeric values to text word equivalents. After deriving a numeric representation of the received DTMF signal, the DTMF converter 140 can include a data structure which can map number clusters to corresponding text equivalents. For example, the date "10, 20, 70" can be converted into "ten twenty seventy".

As shown in FIG. 1, in addition to using prosodic information to determine the proper text equivalent of received DTMF signals, the DTMF converter 140 can be connected to the NLU system 160 via a feedback loop. In that case, the DTMF converter 140 can receive contextual information from the NLU system 160 to determine the proper text equivalent for the DTMF signals. For example, if during determination of the meaning of a text phrase, the NLU system predicts a date, this information can be fed back to the DTMF converter 140 such that a six digit number can be converted to three text equivalents each representing a two digit number. Thus, a DTMF signal representing the digit string "111001" can be converted to "eleven, ten, zero-one" or eleven, ten, two thousand one". Similarly, if a telephone number is expected by the NLU system 160, that information can be fed back to the DTMF converter 140. Thus, a DTMF signal representing a 7 digit number can be clustered into a three digit number and a four digit number. Accordingly, the DTMF converter 140 can convert the three digit number into a text equivalent and the four digit number into a text equivalent. Regardless of whether the DTMF converter 140 uses prosodic information, a feedback loop, or both, the resulting text equivalents each can have a corresponding time stamp derived from the original time stamps of the constituent DTMF signals.

Further, it should be appreciated that manner in which the DTMF converter 140 clusters numbers can be determined by a system designer. For example, a system designer can determine that an NLU system recognizes personal identification codes more accurately when supplied to the NLU system as individual digits such as "one, two, three, four". Alternatively, the system designer can determine that the NLU system functions more accurately when it receives a single larger number such as "one thousand two hundred and thirty four". The exact text equivalents to which the DTMF signal is converted can vary system by system depending upon the intended application. After the DTMF converter 140 converts the received signal to a text equivalent, the resulting text equivalent and corresponding time stamp can be provided to the collator 125.

The collator 125 can reassemble text using the time stamps associated with each text word. For example, though a user can say "my personal identification number is", which can be converted to text in the speech recognition system, and then type "1234", which can be converted to a text equivalent in the DTMF converter, the resulting text can be reassembled in the collator to read "my personal identification number is one two three four". Thus, any received text can be synchronized in this manner before providing the resulting collated text to the NLU system 130 for extracting information for processing by another system or application.

Figure 2:
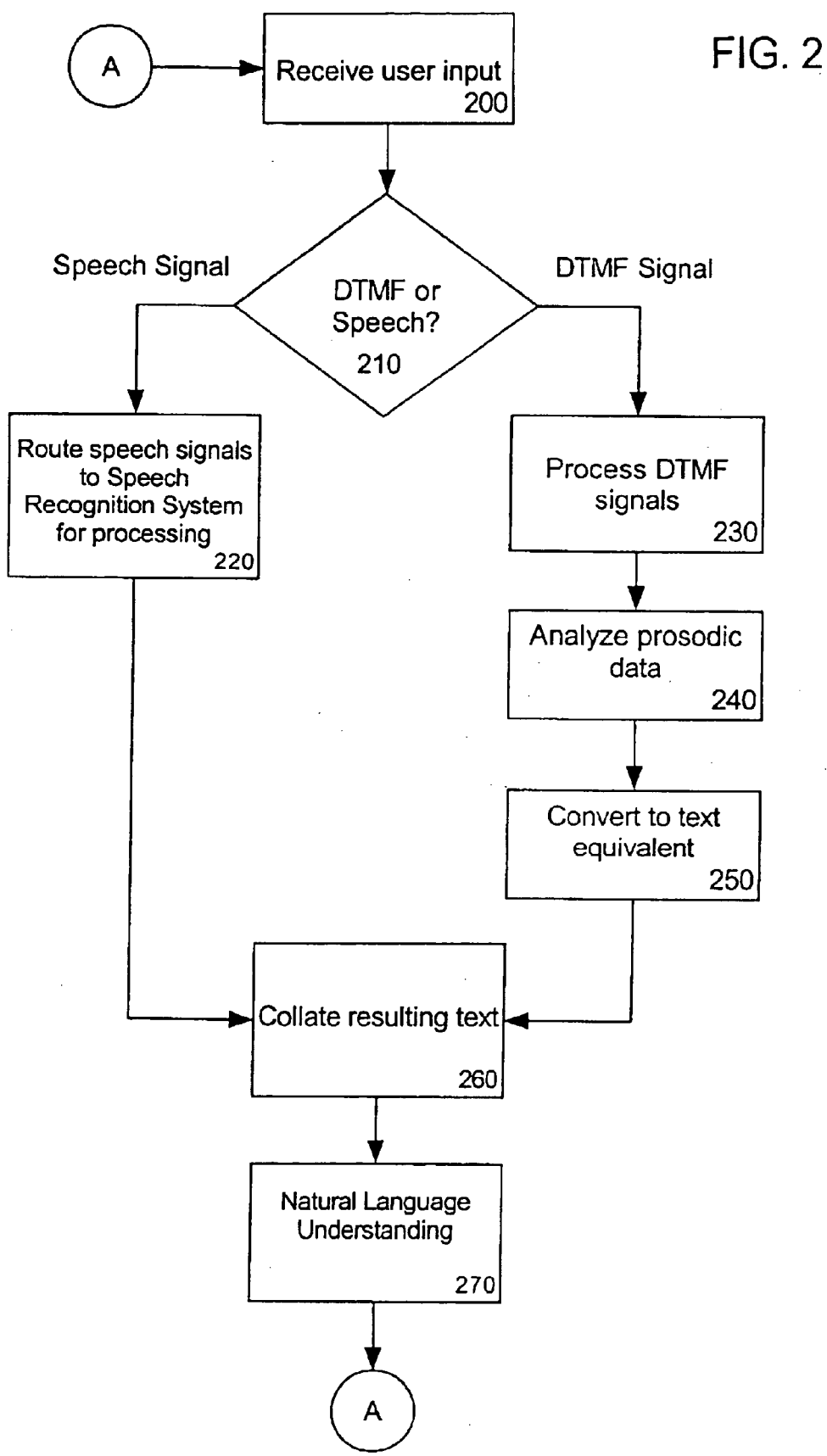
FIG. 2 is a flow chart illustrating an exemplary method of the invention.

FIG. 2 is a flow chart illustrating a method for processing DTMF signals for use with an NLU system as performed by the IVR unit 115 of FIG. 1. According to one embodiment of the invention, the IVR unit is placed in a mode awaiting an input originating from a user through the telephone switching system. Beginning at step 200, a user input can be received for processing. Notably, the user input can be in digital format and the data packets can be time stamped for later processing. After completion of step 200, the method can proceed to step 210.

In step 210, a determination can be made as to whether the received input is a DTMF signal or a human voice signal. As mentioned, DTMF signals are comprised of two independent tones, and using digital signal processing and filtering commonly known in the art, are distinguishable from a human voice. If the received input signal is determined to be a human voice signal, the method can proceed to step 220 where the signal can be provided to the speech recognition system for converting speech to text. If, however, the received input signal is determined to be a DTMF signal, the method can proceed to step 230.

In step 230, the received DTMF signal can be processed to determine the numeric values represented by the signal. Using digital signal processing technology known in the art, the DTMF signal can be converted into corresponding numeric values. For example, if a user pressed the touch buttons "31" on the telephone, the IVR unit can identify the frequencies of 697 Hz and 1497 Hz as representing a "3". Similarly, the IVR unit can identify the frequencies of 697 Hz and 1209 Hz as representing a "1". After identifying the numeric values corresponding to the received DTMF signal, the method can proceed to step 240.

In step 240, the prosodic data corresponding to the received DTMF signal can be analyzed. Prosodic data relates to the rhythmic pattern of the DTMF signal. For example, prosodic data can be the amount of elapsed time between consecutive key touches triggering the DTMF signal. Specifically, the IVR unit can measure the elapsed time between the user pressing a first touch key and a second touch key. Such prosodic information can help to determine number groupings or clusters of digits to be converted to a text equivalent. In particular, if a user enters a birth date such as "1 2 70" using telephone touch keys, in all likelihood, there will be a longer pause between the 1 and 2, and the 2 and 7, than between the other numbers. Typically, the user instinctively groups the individual numbers comprising the month, the ordinal, and the year closer together in time. Similarly, the user instinctively places a natural pause between the month, ordinal, and the year. After analyzing the prosodic information corresponding to the received DTMF signal or signals, the method can proceed to step 250.

In step 250, the received DTMF signal can be converted to a text equivalent using the prosodic information determined in step 240. Specifically, each grouping or cluster of numbers can be grouped as a digit string. The IVR unit can map the digit strings into text equivalents of the numbers. For example, the digit string "10" can be converted to the text equivalent "ten". Notably, the IVR unit can utilize the prosodic information previously determined to convert a digit string into a more usable text equivalent. Taking the digit string "10", if the IVR unit detects no pause or a minimal pause between the 1 and the 0, the digit string can be interpreted as the single number "10". Thus, the number can be converted to the text equivalent "ten". If, however, a pause is detected between the 1 and the 0, the digit string can be interpreted as the two separate numbers "1" and " ". In that case, the numbers can be converted to the text equivalents "one" and "zero". Notably the IVR unit can include a user adjustable parameter or minimum threshold value for determining whether a pause exists.

This approach can be useful with regard to dates. For example, the digit string "12070" can be interpreted as a variety of numbers depending on the prosodic information corresponding to the digit string. Exemplary text equivalents can be "one, two, zero, seven, zero", "twelve thousand seventy", "one hundred twenty, seventy", etc. Notably, if the user was entering a birth date, the prosodic information likely will indicate the following text equivalents "one, twenty, seventy" to indicate a birth date of Jan. 20, 1970.

It should be appreciated that because the resulting text equivalents can be provided to an NLU module for extracting meaning, the optimal set of text equivalents can vary depending upon the particular function of the IVR unit and need not be determined by prosodic analysis. For example, the IVR unit can have a default setting such that digit strings of four digits, such as "1234", can be interpreted as a personal identification code. Consequently, the text equivalent can be "one, two, three, four", "twelve, thirty four", "one thousand two hundred thirty four", etc. The system designer can determine the most suitable text equivalent output such that the NLU system can function to most accurately extract meaning from the text equivalents.

In addition to using prosodic information to determine a text equivalent for a DTMF signal, a feedback loop between the DTMF converter and the NLU system can be established. In this manner, the DTMF converter can be provided with information as to what type of input is expected by the NLU system. For example, the NLU system can determine that a date is expected. Consequently, the DTMF converter can interpret a received digit string as a date and convert the numbers into corresponding text equivalents. For example, a six digit number can be converted into three separate two digit numbers representing the month, ordinal, and year respectively. Similarly, if the NLU system determines that a time is most likely, the DTMF can convert or map a digit string to a suitable time text equivalent. Further, it should be appreciated that the method of the invention can use either prosodic information, feedback information from the NLU system, or a combination of both in determining the text equivalents for received DTMF signals. After completion of step 250, the method can proceed to step 260.

In step 260, the text from the speech recognition system and text equivalents from the DTMF converter are supplied to the collator. The collator can reassemble a text phrase in proper order using the time stamp information associated with each text word or text equivalent. For example, the text "my personal identification number is"from the speech recognition system can be joined with the text equivalents "one two three four" such that the complete text phrase "my personal identification number is one two three four" can be provided to the NLU system.

In step 270, the NLU system can extract a meaning from the reassembled text phrase. Notably, using the method of the invention, the various pre-processing steps of an NLU system for extracting meaning from text need not be bypassed. Rather, text equivalents of DTMF signals can be provided directly to the NLU system without having to circumvent any pre-processing.

What is claimed is:

1. A method for processing dual tone multi-frequency signals for use with a natural language understanding system, said method comprising:
    receiving a user input comprising dual tone multi-frequency signals;
    determining at least one prosodic characteristic of the dual tone multi-frequency signals;
    grouping selected ones of the dual tone multi-frequency signals according to said determining step; and
    converting the dual tone multi-frequency signals to one of a plurality of different textual representations according to said grouping step.

2. The method of claim 1, said determining step further comprising measuring a time period between at least two of the dual tone multi-frequency signals.

3. The method of claim 1, wherein said contextual information is determined by a natural language understanding system and said grouping step is preformed by a dual tone multi-frequency converter, such that said natural language understanding system provides the contextual information as feedback to the dual tone multi-frequency converter.

4. The method of claim 1, further comprising:
    determining contextual information for the received user input; and
    using the contextual information for performing said grouping and converging steps.

5. The method of claim 4, wherein the user input further comprises user speech.

6. A machine readable storage, having stored thereon a computer program having a plurality of code sections executable by a machine for causing the machine to perform the steps of:
    receiving a user input comprising dual lone multi-frequency signals;
    determining at least one prosodic characteristic of the dual tone multi-frequency signals;
    grouping selected ones of the dual tone multi-frequency signals according to said determining step; and
    converting the dual tone multi-frequency signals to one of a plurality of different textual representations according to said grouping step.

7. The machine readable storage of claim 6, said determining step further comprising measuring a time period between at least two of the dual tone multi-frequency signals.

8. The machine readable storage of claim 6, wherein— said contextual information is determined by a natural language understanding system and said grouping step is performed by a dual tone multi-frequency converter, such that said natural language understanding system provides the contextual information as feedback to the dual tone multi-frequency converter.

9. The machine readable storage of claim 6, further comprising:
    determining contextual information for the received user input; and
    using the contextual information a information for performing said grouping and converting steps.

10. The shine readable storage of claim 9, wherein—the user input further comprises user speech.

11. A system for converting dual tone multi-frequency signals into text equivalents for use with a natural language understanding system said system comprising:
    an interactive voice response unit for receiving user inputs comprising user spoken utterances and dual tone multi-frequency signals;
    a dual tone multi-frequency converter configured to determine at least one prosodic characteristic of the dual tone multi-frequency signals, group selected ones of the dual tone multi-frequency signals according to the prosodic characteristics, and convert the dual tone-multi frequency signals to one of a plurality of different text representations according to the groupings of dual tone multi-frequency signals; and
    a natural language understanding system for determining a meaning from text converted from said user spoken utterances and said text representations.

12. The system of claim 11, wherein said the at least one prosodic characteristic is determined by measuring a time period between at least two of the dual tone multi-frequency signals.

13. The system of claim 11, wherein said natural language understanding system determines contextual information for the user inputs and provides the contextual information to the dual tone multi-frequency converter for use in grouping the selected ones of the dual tone multi-frequency signals and converting the dual tone multi-frequency signals to text equivalents.

14. The system of claim 11, further comprising:
a speech recognition system for converting said user spoken utterances to said text.

15. The system of claim 14, further comprising:
a collator for collating said text converted from said user spoken utterances and said text equivalents.

16. A system for converting dual tone multi-frequency signals into text equivalents for use with a natural language understanding system, said system comprising:
means for receiving a user input comprising dual tone multi-frequency signals;
means for determining at least one prosodic characteristic of the dual tone multi-frequency signals:
means for grouping selected, ones of the dual tone multi-frequency signals according to said determining step; and
means for converting the dual tone multi-frequency signals to one of a plurality of different textual representations according to said grouping step.

17. The system of claim 16, said means for determining further comprising means for measuring a time period between at least two of the dual tone multi-frequency signal.

18. The system of claim 16, wherein said means for determining contextual information provide the contextual information on to said means for grouping and said means for converting.

19. The system of claim 16, further comprising:
means for determining contextual information for the received user input; and
means for using the contextual information for performing said grouping and converting steps.

20. The system of claim 19, wherein the user input further comprises user speech.

* * * * *